United States Patent [19]

Kress et al.

[11] 4,296,896
[45] Oct. 27, 1981

[54] VTOL AIRPLANE

[75] Inventors: Robert W. Kress, Lloyd Harbor; Anthony C. Bacchi, Massapequa, both of N.Y.

[73] Assignee: Grumman Aerospace Corporation, Bethpage, N.Y.

[21] Appl. No.: 70,260

[22] Filed: Aug. 27, 1979

[51] Int. Cl.³ .................... B64C 29/00; B64C 15/12
[52] U.S. Cl. .................................. 244/12.4; 244/55; 244/56
[58] Field of Search ............ 244/12.4, 7 R, 7 C, 244/23 A, 56, 102 R, 45 R, 54, 55

[56] References Cited

U.S. PATENT DOCUMENTS

| | | | |
|---|---|---|---|
| D. 85,198 | 9/1931 | Papke | 244/45 R |
| 3,136,499 | 6/1964 | Kessler | 244/7 C |
| 3,284,027 | 11/1966 | Mesniere | 244/12.4 |
| 3,360,217 | 12/1967 | Trotter | 244/12.4 |
| 3,567,157 | 3/1971 | Dancik | 244/12.4 X |
| 3,966,142 | 6/1976 | Corbett et al. | 244/12.4 |
| 4,149,688 | 4/1979 | McMiller | 244/56 |

FOREIGN PATENT DOCUMENTS

| | | | |
|---|---|---|---|
| 1053322 | 3/1959 | Fed. Rep. of Germany | 244/12.4 |
| 1089273 | 9/1960 | Fed. Rep. of Germany | 244/12.4 |
| 1135769 | 8/1962 | Fed. Rep. of Germany | 244/12.4 |
| 2508018 | 9/1976 | Fed. Rep. of Germany | 244/56 |
| 1178843 | 5/1959 | France | 244/12.4 |
| 1271102 | 4/1972 | United Kingdom | 244/7 C |

OTHER PUBLICATIONS

"Fairchild Republic A-10", *Jane's All the World's Aircraft 1977–1978*, pp. 293–295.
*Aircraft Engineering*, Mar. 1970, p. 25.
"Application of Hypersonic Favorable Aerodynamic Interference Concepts to Supersonic Aircarft", Kulfan, AIAA Aircraft Sys. and Tech. Conf., Los Angeles, Calif. Aug. 21-23, 1978.

*Primary Examiner*—Galen L. Barefoot
*Attorney, Agent, or Firm*—Richard G. Geib; Mellor A. Gill

[57] ABSTRACT

A VTOL airplane having a stub wing integrating a powerplant to either side of an airplane fuselage to rotatably relate the powerplant means to the airplane fuselage for uniform rotation, allow for flexible interconnecting design and lower the use of gravitational and aerodynamic moments in assistance of rotation of this powerplant/stub wing assembly.

6 Claims, 7 Drawing Figures

VTOL AIRPLANE

BACKGROUND FOR INVENTION

As the airplane technology advances, so too does the desire to make such available so that it may enjoy a wider use. In days gone by, for example, airplanes were launched and retrieved by various types of ships of the Navy fleet other than aircraft carriers. Today many such ships use helicopters, as do certain non-military applications such as offshore oil rigs and other deep ocean installations. This is primarily due to a lack of an airplane that can alight and take off from the limited areas available at such places.

It is and has been readily recognized that inadequate range and speed limitations of helicopters make them at best a compromise with what is desired. This is to say nothing of the fact that as the work loads increase, the helicopter size grows to where, even now, in some roles, one must hover to take on and discharge loads. Furthermore, the complexities of helicopter construction and control lead to maintenance requirements that are burdensome economically.

It was no doubt with a recognition of a need to bring back fixed wing aircraft to these roles that many prior inventors toiled with limited success.

There was, as many may recall, the efforts by major airplane manufacturers to suggest that "tail-sitters" or "tilt-wings" may be solutions to the problems of finding a practical vertical take off and landing (VTOL) airplane having high speed and range performance of a fixed wing airplane. Neither of these approaches to a VTOL had more than a success in the media; i.e., they have not proven to be the practical design needed by either the military or commercial enterprises to justify adherence to other than the compromise of the helicopter operation.

It has been of particular note that in France in 1955, it was suggested one might employ rotatable powerplants on wings of a conventional airplane having conventional tail and wing controls to obtain a short take off and landing (STOL) airplane. This is shown by U.S. Pat. No. 2,971,725. Seven years later in 1962, Professor Calderon of Peru suggested that one may dispense with conventional tail pitch and yaw control surfaces by using a movable surface behind ducted fan means that pivot between a horizontal attitude to a vertical attitude out at the wing tips. This was disclosed to the public in U.S. Pat. No. 3,167,273. Next it was suggested in Germany in 1966 that one could take jet engines, two on each side, one of which was ahead and under and the other projecting above and behind a wing, and rotate same about an axis so that their thrust axis in the vertical position was equidistantly adjacent the airplane center of gravity point in the fuselage. This was disclosed by U.S. Pat. No. 3,469,803.

Presently, the only known VTOL in use in the world is the British Harrier used by the U.S. Marine Corp. This airplane has jet propulsion means with a plurality of exhaust nozzles to either side of the airplane's fuselage. These nozzles rotate so as to provide horizontal and vertical thrust for the airplane. Therefore, one can fly the Harrier as a fixed wing airplane and operate in a VTOL mode as well.

With this background, the assignee of this invention devised a tail-sitter type airplane, for lack of a better self-coined label, shown by U.S. Pat. No. 3,966,142 this pretty much was and is the VTOL background for this invention. As for the airplane that is shown by assignee's patent aforesaid, there a propulsion means to either side of a fuselage, as by side pylons or podded wing units, is arranged to wash the empennage of the airplane to maximize control moments from rudder and elevator movements.

One additional type VTOL airplane has, however, emerged. This new type VTOL airplane is a result of an invention of patentees and is shown by U.S. Pat. No. 4,116,405. In general, this new VTOL is a canard type gull-wing airplane. It is in the carrying forth of the ideas of that airplane that the instant invention was realized.

More particularly, with the airplane of U.S. Pat. No. 4,116,405, it became desirable to improve the cross-shafting of propulsion units to eliminate drive angles, transmission connections, and as a result, mass of such drive. It also is the intent to disclose by these Letters Patent, an airplane that may in the vertical take off and landing mode avail of positive ground effect and to do all this while retaining the cooperative relationship of patentees innovative concepts in U.S. Pat. No. 4,116,405.

SUMMARY

The VTOL airplane concept herein disclosed is for a fixed wing conventional airplane powered by pivotable fan jet powerplants to which a means has been devised to short couple such powerplants with a stub wing ahead of the fixed wing that will permit low mass weight in the actuation of the powerplants from their fixed wing (horizontal) mode where they emerge from under the wing, high on the fuselage to a VTOL (vertical) mode ahead of the wing and utilize a short simple couple to interrelate the powerplants; and, by certain additions to the airplane fuselage, utilize principles of ground effect for the betterment of the VTOL mode.

DRAWING DESCRIPTION

Figures 1, 2:
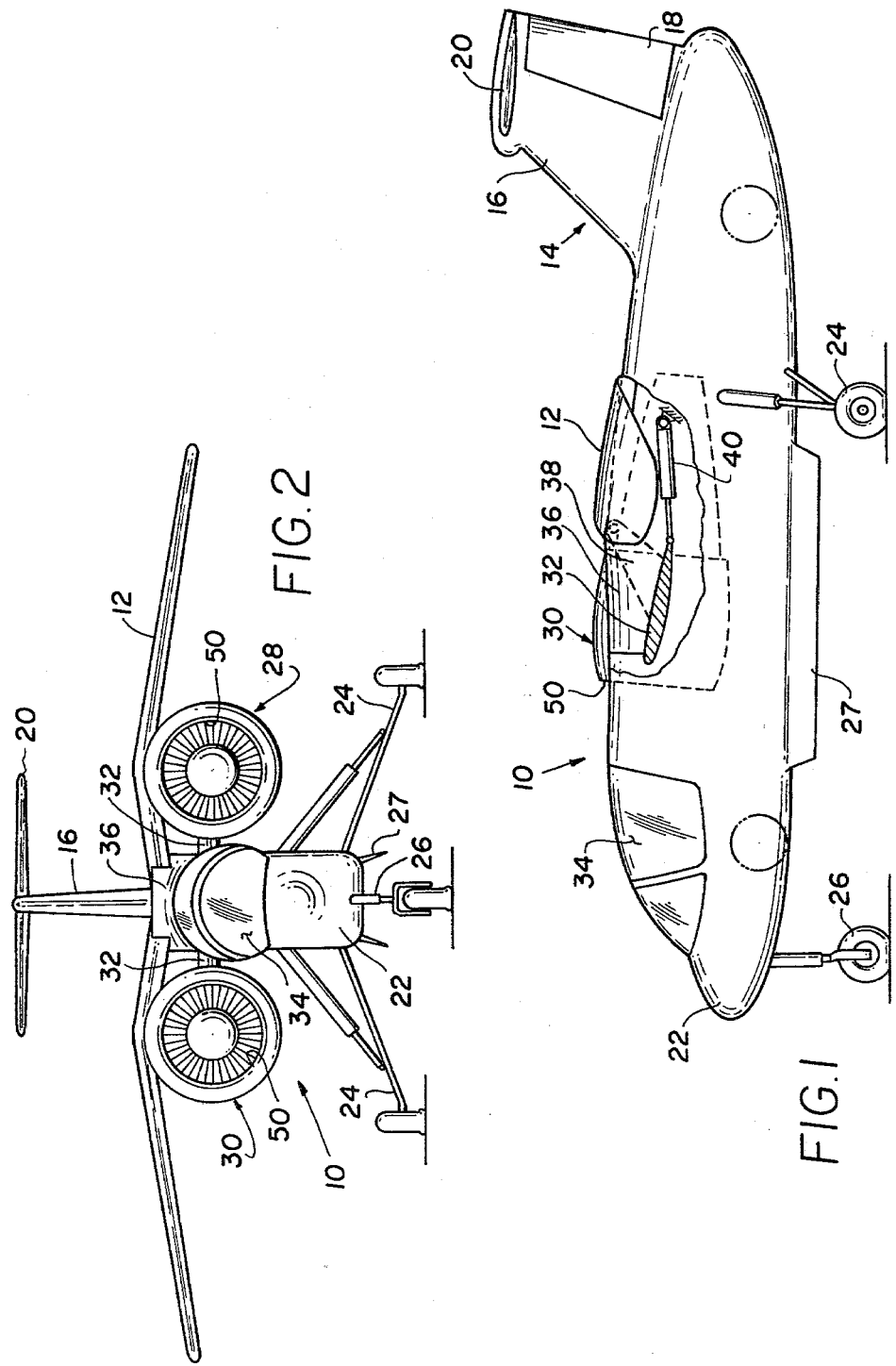
FIGS. 1, 2 and 3 are side, frontal and plan views of an airplane incorporating a novel powerplant assembly according to this invention.
Figure 3:
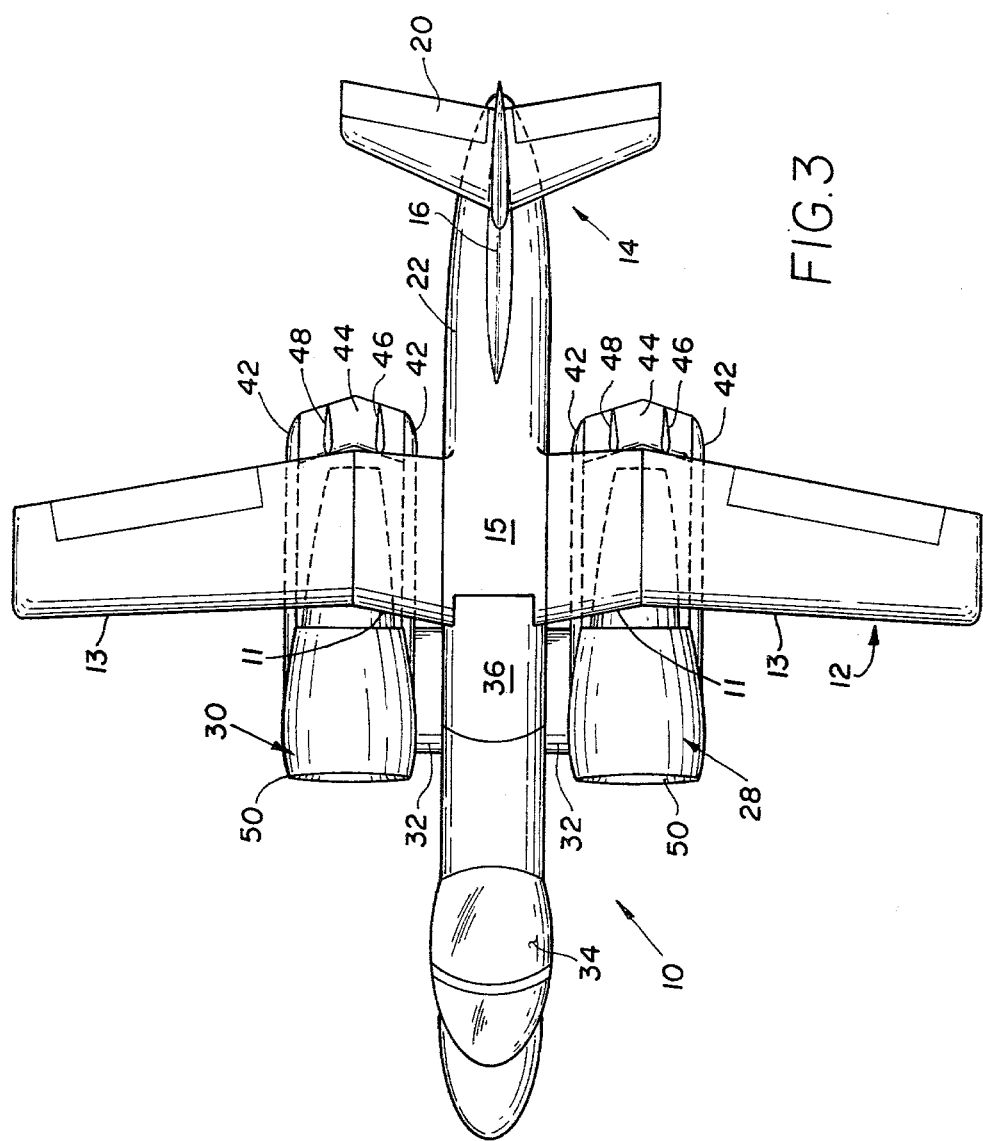
Figure 6:
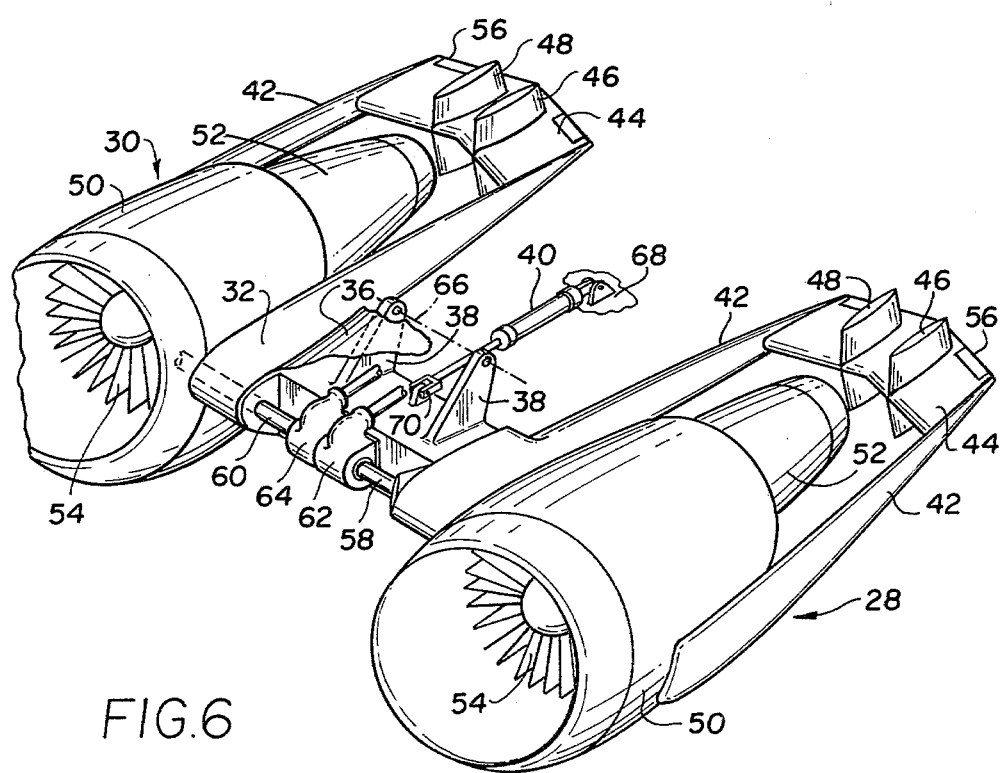
Figure 7:
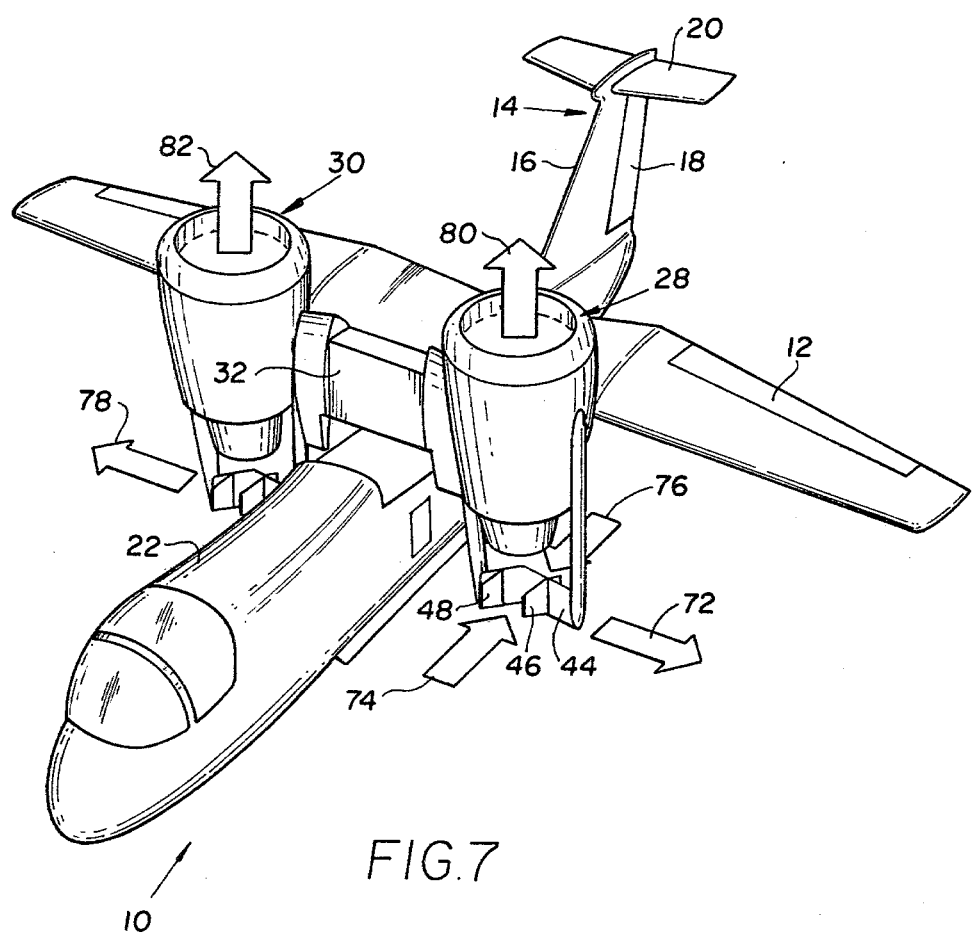

FIG. 6 is an isometric view of the powerplant assembly for use in the airplane as shown by FIGS. 1, 2 and 3; and FIG. 7 is an isometric view of the airplane of FIGS. 1, 2 and 3 showing the powerplant assembly rotated from its normal take off and landing and cruise attitude as shown by FIGS. 1, 2 and 3 to the powerplant assembly's vertical take off and landing (VTOL) and hover attitude.

DETAILED DESCRIPTION

With more specific reference to the drawings, FIGS. 1, 2 and 3 show an airplane 10 having a high, gull-wing 12 and an empennage 14 including a vertical fin 16 with rudder 18 and an all movable elevator 20 high on the fin 16. The gull-wing 12 is comprised of outboard sections joined to inboard sections on opposite sides of the fuselage and connected by a center wing box section 15 to each other and to the fuselage 22 similar to that disclosed by aformention U.S. Pat. No. 4,116,405.

Retractable into and extendable from appropriate rearward and forward cavities of fuselage 22 is a tricycle type landing gear having a main gear 24 and a nose gear 26.

At the bottom of the fuselage are strakes 27. While these strakes are to primarily house antennas, they also serve to provide a positive ground effect for the airplane due to their location and angularity.

Powerplant means, comprising in the preferred instance fan jet propulsion devices 28 and 30, are mounted to a stub wing 32 that extends as an integral element between the fan jets 28 and 30 through the upper portion of the fuselage 22 behind the cockpit 34 and ahead of the gull-wing 12. A fairing 36 is provided to contour the mating of the stub wing and fuselage adjacent the wing center section leading edge. Within the fairing is a pivot arm 38 that mounts the stub wing so that it may be rotated as by an actuator 40 shown in FIGS. 1 and 6, which shall be discussed in further detail with regard to FIG. 7 hereinafter.

Figure 4:
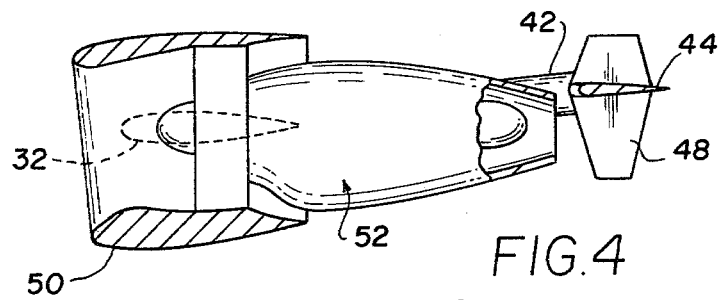
FIGS. 4 and 5 are a partially cross-sectioned side view and a plan view of powerplant means for use in the powerplant assembly of FIGS. 1, 2 and 3.
Figure 5:
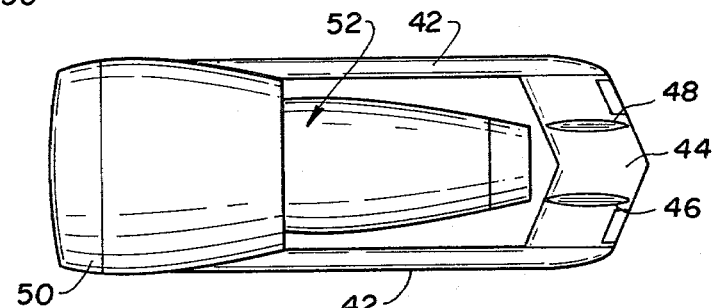

The powerplant means or fan jets have, as may be seen in our U.S. Pat. No. 4,116,405, trailing booms 42 (see FIGS. 3, 4 and 5) that rotatably mount a horizontal control surface 44 to which is in turn rotatably mounted vertical control surfaces 46 and 48. These control surfaces function similar to that described in our aforesaid U.S. Pat. No. 4,116,405 to provide assistance in controlling the airplane 10 about its pitch, roll and yaw axis. Further, with reference particularly to FIGS. 1 and 4, the stub wing 32 is attached to each fan jet means via the forward fan nacelle 50 with the greater mass of the jet engine 52 behind the axis of the attachment. This arrangement will allow for use of the engine mass to assist in rotation both as to its gravitational moment and its drag moment.

With more particular reference now to FIG. 6, the powerplant means is shown to include two similar fan jets inclusive of a jet engine 52 for powering a fan 54 within a fan housing 50. Both the fan exhaust and the jet core exhaust are directed about the control surfaces 44, 46 and 48. It should be noted that control surface 44 in FIG. 6 is inclusive of a trailing edge 56 that is hinged to surface 44 to function as a trailing edge flap as desired.

Stub wing 32 and fairing 36 are shown in broken cross-section to allow the viewing of the cross shafts 58 and 60 that interconnects fan jets 28 and 30. Within the stub wing, it is proposed to adapt conventional power taken off device and coupling gear box 62 and 64 to the cross shafts to allow for synchronization of the separate fan jets and fail-safe accessory drive for airplane systems deriving energy be it hydraulic, pneumatic or electrical from the powerplant means.

The pivot arms 38 can be seen to project upwardly and rearwardly from their structural attachment of the stub wing 32 to provide a vertically displaced pivot axis 66 for the powerplant assembly. Actuator 40 is attached to the fuselage, as at 68, and to the structure 70 of the stub wing between the pivot arms 38.

OPERATION

In operation, the airplane 10 is capable of normal fixed-wing type of flight in the arrangement shown by FIGS. 1, 2 and 3. By operation of controls known to one skilled in the art to vary lift over control surface 44, to extend actuator 40 and to avail of gravitational moments about pivot axis 66, the stub wing 32 will rotate upwardly as shown by FIG. 7 to place the propulsion means 28 and 30 in the vertical attitude shown also by FIG. 7.

In such attitude and by operation of the control devices within the airplane, one can control the extent of resultant thrust vector illustrated by arrows 72, 74, 76 and 78 while regulating resultant vertical thrust vectors illustrated by arrows 80 and 82. This will provide the desired control of pitch, roll, yaw and vertical lift in the VTOL mode.

The advantages of this innovative design with reference to the prior art such as embodied in our earlier U.S. Pat. No. 4,116,405, is the lessening of mass weight to be overcome in rotating propulsion means, eliminating problems of drive means alignment for interrelation of the propulsion means and providing stronger mounting and closer coupling for propulsion means that must be rotated between one position and another. Furthermore, the structure hereby disclosed allows for flexibility of design as to cross shafting, engine coupling and accommodating fail-safe power take off means as it does not have to be located on the engine or powerplant assembly pivot axis. Finally, the stub wing integration of rotatable propulsion devices eliminates any possibility of non-uniform engine rotation with far fewer actuation devices, and consequently, problems. Fact of the matter is, with the structure hereby disclosed, there is for the first time disclosed to the prior art a fail-safe system for powerplant reorientation in that should the actuator 40 fail, then the control surfaces of but one fan jet may be used to reposition both uniformly.

Having described an operative embodiment of a structure arrangement for the innovation disclosed by these Letters Patent, it is now desired to set forth the intended protection for same by a set of appended claims.

We claim:

1. An airplane and powerplant combination comprising:
   an airplane fuselage;
   a stub wing mounted through said fuselage so as to be movable relative thereto;
   fan jet means mounted to said stub wing at least one on either side of said fuselage;
   an airplane wing joined to said fuselage behind said stub wing with said fan jet means extending from ahead of said stub wing, under the airplane wing to a position adjacent the trailing edge of the airplane wing;
   a pivot arm means fixed to said stub wing;
   a means to connect said pivot arm means to said fuselage so as to rotate about an axis above said stub wing;
   an actuator connected between said fuselage and said stub wing to rotate said stub wing about the axis above said stub wing in positioning said fan jet means in a plane ahead of, and normal to the chord of the airplane wing whereby the thrust axis of said fan jet means may be rotated from a position parallel to a longitudinal axis of the fuselage to a position normal to said longitudinal axis of the fuselage.

2. The combination of claim 1 wherein said stub wing includes provisions in its leading edge to cross shaft the fan jet means.

3. The combination of claim 2 wherein the stub wing has a power take off means operatively associated with said cross shaft.

4. The combination of claim 1 and further comprising strake means depending at an outward angle from both sides of the fuselage to provide positive ground effect for the airplane when the fan jet means is in the attitude where its thrust axis is normal to the longitudinal axis of the fuselage.

5. An airplane comprising:
- a fuselage;
- an empennage;
- wing means attached to said fuselage, said wing means including inboard and outboard sections on opposite sides of the fuselage joined in a gull shape such that there is a contour that rises from the fuselage to a high point at a juncture of inboard and outboard sections and a declination from the high point to the tip of the outboard section, said wing means being connected by a center wing box section between the inboard sections at the top of said fuselage where said center wing box section is attached;
- a stub wing projecting outwardly from each side of the top of said fuselage ahead of said center wing box section of said wing means, said stub wing being mounted for rotation relative to said fuselage by pivot arm means;
- powerplant means mounted to said stub wings on opposite sides of the fuselage to locate the powerplant means to extend under the wing means within the contour at the high point of juncture of the inboard and outboard sections of the wing means;
- actuator means between the fuselage and the stub wing to rotate the stub wing about an axis above the centerline of the powerplant means and adjacent the leading edge of the wing box section to rotate said powerplant means from under the wing means to a vertical attitude forward of the wing means; and
- landing gear means having a nose landing gear and two main landing gears one to either side that provide a footprint of wider expanse than the lateral dimension of the powerplant means on opposite sides of the fuselage.

6. An airplane that is convertible from one having vertical take-off and landing capabilities to one that is configured for high performance characteristics of fixed wing airplanes, said airplane comprising:
- a fuselage with an empennage and a gull wing on opposite sides and high on said fuselage;
- fan jets mounted by a stub wing extending through said fuselage on a high level in front of the gull wings on either side of the fuselage to locate inlets of the fan jets ahead of the gull wings with the remaining engine structure of each fan jet being extended in their horizontal attitude under a high point of the gull wing on opposite sides of the fuselage;
- trailing boom means affixed to the engine structure of each of said fan jets, said trailing boom means mounting control means having movable control surfaces within the confluence of the exhaust of said fan jet means; and
- actuator means between said fuselage and said stub wing to rotate said fan jets, by rotating said stub wing about an axis above the centerline of the fan jets and adjacent the gull wings high on said fuselage whereby said engine structure is rotated from under the gull wings to a vertical attitude ahead of the gull wings.

* * * * *